(12) United States Patent
Hsu et al.

(10) Patent No.: US 8,935,528 B2
(45) Date of Patent: Jan. 13, 2015

(54) TECHNIQUES FOR ENSURING AUTHENTICATION AND INTEGRITY OF COMMUNICATIONS

(75) Inventors: Wen-Pin Scott Hsu, Redmond, WA (US); Tarik Soulami, Redmond, WA (US); Mark Zagorski, Redmond, WA (US); Ning Zhang, Bothell, WA (US); Brian Perlman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 979 days.

(21) Appl. No.: 12/146,520

(22) Filed: Jun. 26, 2008

(65) Prior Publication Data

US 2009/0327737 A1 Dec. 31, 2009

(51) Int. Cl.
| | |
|---|---|
| H04L 29/06 | (2006.01) |
| G06F 21/12 | (2013.01) |
| G06F 21/31 | (2013.01) |
| H04W 12/06 | (2009.01) |
| H04L 9/32 | (2006.01) |
| G06F 21/60 | (2013.01) |
| H04L 9/30 | (2006.01) |
| H04L 9/08 | (2006.01) |
| H04M 3/16 | (2006.01) |

(52) U.S. Cl.
CPC .............. H04L 63/12 (2013.01); H04W 12/06 (2013.01); H04L 9/32 (2013.01); H04L 63/08 (2013.01); G06F 21/608 (2013.01); H04L 9/30 (2013.01); H04L 9/08 (2013.01); H04M 3/16 (2013.01); G06F 21/121 (2013.01); G06F 21/31 (2013.01); G06F 2221/2103 (2013.01); G06F 2221/2107 (2013.01); G06F 2221/2137 (2013.01); H04L 9/3247 (2013.01); H04L 63/0869 (2013.01); H04L 2209/60 (2013.01)
USPC ............................. 713/168; 380/277; 455/410

(58) Field of Classification Search
CPC ............. H04L 9/32; H04L 9/30; H04L 63/12; H04W 12/06; H04M 3/16
USPC ...................... 713/170, 171, 150, 168; 705/59
See application file for complete search history.

(56) References Cited

U.S. PATENT DOCUMENTS 6,169,976 B1 * 1/2001 Colosso ......................... 705/59
6,188,995 B1   2/2001 Garst et al.
(Continued)

FOREIGN PATENT DOCUMENTS

| CN | 1545295 A | * | 11/2004 |
| CN | 1700634 A | * | 11/2005 |

(Continued)

OTHER PUBLICATIONS

Freier et al., "The SSL Protocol Version 3.0", 1996.*

(Continued)

Primary Examiner — Ondrej C. Vostal
(74) Attorney, Agent, or Firm — Timothy Churna; Kate Drakos; Micky Minhas

(57) ABSTRACT

Techniques are described for ensuring data integrity and authentication of received messages. One technique includes sending a request from a first module to a second module in which the request includes a first portion that is a shared secret encrypted with a public key, obtaining by the second module a private key from a secure and trusted information store, such as a license information store, including license information or other application specific information for the first module, using the private key to decrypt the first portion and obtain the shared secret, sending a response from the second module to the first module in which the response includes authentication data and at least one data item used with the shared secret to determine the authentication data, and performing by the first module verification processing to verify the authentication data included in the response.

20 Claims, 10 Drawing Sheets

(56) References Cited

U.S. PATENT DOCUMENTS

| | | | |
|---|---|---|---|
| 7,080,041 B2* | 7/2006 | Nagel | 705/51 |
| 7,234,636 B1 | 6/2007 | Brausch et al. | |
| 7,356,692 B2 | 4/2008 | Bialick et al. | |
| 7,484,094 B1* | 1/2009 | Millard et al. | 713/165 |
| 7,487,353 B2 | 2/2009 | Pryor et al. | |
| 8,566,247 B1* | 10/2013 | Nagel et al. | 705/59 |
| 2002/0116341 A1* | 8/2002 | Hogan et al. | 705/64 |
| 2002/0129236 A1* | 9/2002 | Nuutinen | 713/151 |
| 2002/0157089 A1* | 10/2002 | Patel et al. | 717/178 |
| 2003/0084306 A1* | 5/2003 | Abburi et al. | 713/188 |
| 2003/0149670 A1 | 8/2003 | Cronce | |
| 2003/0217275 A1* | 11/2003 | Bentley et al. | 713/184 |
| 2004/0034770 A1 | 2/2004 | Kaler et al. | |
| 2004/0109567 A1* | 6/2004 | Yang et al. | 380/277 |
| 2004/0236956 A1* | 11/2004 | Shen et al. | 713/193 |
| 2005/0044356 A1* | 2/2005 | Srivastava et al. | 713/163 |
| 2005/0091168 A1 | 4/2005 | Gunyakti et al. | |
| 2005/0125358 A1 | 6/2005 | Levin et al. | |
| 2005/0232426 A1* | 10/2005 | Konersmann et al. | 380/277 |
| 2005/0273592 A1* | 12/2005 | Pryor et al. | 713/150 |
| 2005/0273780 A1* | 12/2005 | Torvinen | 717/171 |
| 2006/0168580 A1 | 7/2006 | Harada et al. | |
| 2006/0200857 A1* | 9/2006 | Yokota | 726/6 |
| 2006/0294594 A1 | 12/2006 | Andreaux et al. | |
| 2007/0016532 A1 | 1/2007 | Zhang et al. | |
| 2007/0060106 A1* | 3/2007 | Haverinen et al. | 455/410 |
| 2007/0143227 A1* | 6/2007 | Kranzley et al. | 705/67 |
| 2007/0220279 A1* | 9/2007 | Northcutt et al. | 713/193 |
| 2007/0277038 A1* | 11/2007 | Hardy et al. | 713/176 |
| 2007/0289025 A1* | 12/2007 | Tanaka et al. | 726/28 |
| 2007/0294496 A1* | 12/2007 | Goss et al. | 711/163 |
| 2008/0082449 A1* | 4/2008 | Wilkinson et al. | 705/59 |
| 2008/0086307 A1* | 4/2008 | Okayama et al. | 704/260 |
| 2008/0091613 A1* | 4/2008 | Gates et al. | 705/59 |
| 2008/0091957 A1* | 4/2008 | Everett et al. | 713/194 |
| 2008/0189794 A1* | 8/2008 | Staring et al. | 726/27 |
| 2009/0089574 A1* | 4/2009 | Pryor et al. | 713/150 |

FOREIGN PATENT DOCUMENTS

| | | | |
|---|---|---|---|
| CN | 1802017 A | | 7/2006 |
| CN | 102077213 A | * | 5/2011 |
| WO | WO 2009158086 A2 | * | 12/2009 |

OTHER PUBLICATIONS

Kirovski et al., "Digital rights management for digital cinema", 2001.*

Riaz et al., "A unified security framework with three key management schemes for wireless sensor networks", 2008.*

Office of People's Republic of China, "First Office Action", 2010.*

International Search Report and Written Opinion Received for PCT Application No. PCT/US2009/044780, mailed on Dec. 16, 2009, 13 pages.

Paraskevas Stefas, "Decentralized Authorization for Web Services", A dissertation submitted to the University of Dublin, Sep. 6, 2005, 87 Pages.

Frederick Hirsch, "Getting Started with XML Security", Nov. 28, 2002, 35 Pages.

Basler, et al., "Mutual Authentication for Web Services: A Live Example", Oct. 24, 2005 http://developers.sun.com/appserver/reference/techart/mutual_auth.html#0.

SIPO; Office Action for Chinese Patent Application No. 200980125617.3 (corresponds to present application), mailed Dec. 11, 2012.

Third Chinese Office Action cited in Chinese Application No. 200980125617.3 dated Dec. 6, 2013, 12 pgs.

Reply Third Chinese Office Action cited in Chinese Application No. 200980125617.3 dated Feb. 18, 2014, 18 pgs.

Int. Preliminary Report cited in PCT Application No. PCT/US2009/044780 dated Jan. 5, 2011, 6 pgs.

Taiwan Search Report cited in Taiwan Application No. 098114894 dated Feb. 19, 2014, 1 pg.

Reply Taiwan Search Report cited in Taiwan Application No. 098114894 dated May 23, 2014, 51 pgs.

Taiwan Notice of Allowance cited in Taiwan Application No. 098114894 dated Jun. 4, 2014, 4 pgs.

Fourth Chinese Office Action cited in Chinese Application No. 200980125617.3 dated Jun. 13, 2014, 11 pgs.

Reply second Chinese Office Action cited in Chinese Application No. 200980125617.3 dated Aug. 29, 2013, 16 pgs.

Reply fourth Chinese Office Action cited in Chinese Application No. 200980125617.3 dated Aug. 5, 2014, 16 pgs.

Chinese Notice of Allowance cited in Chinese Application No. 200980125617.3 dated Sep. 2, 2014, 4 pgs.

* cited by examiner

TECHNIQUES FOR ENSURING AUTHENTICATION AND INTEGRITY OF COMMUNICATIONS

BACKGROUND

Messages may be communicated between a client, or entity originating a request, and a server, or entity responding to the request. The client may send a request message to the server, and the server may send a response message to the client. The client and server may be, for example, two computer systems, two modules on the same computer system, and the like. A problem exists regarding the data integrity and authenticity of messages exchanged between the client and the server. One or both of the client and the server may be concerned regarding the data integrity and authenticity of the messages exchanged. Data integrity may relate to the message content and ensuring that the message received is not a modified version of an original message. Authenticity may relate to the authentication of the sender in that a message received may have been generated by an entity other than the expected sender. In connection with a response received by a client, an attacker may intercept and modify a response originally sent from the server. Thus, the client receives a response having content that has been modified. Rather than intercept a response originally sent by the server, an attacker may also introduce another entity purporting to be the server which generates the response. The latter may occur, for example, if the attacker introduces a module which sends and receives messages in place of the server. Similarly, in connection with requests received by a server, an attacker may intercept and modify an original request or the attacker may otherwise introduce a module which sends and receives messages in place of the requester.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are described for ensuring authenticity and data integrity of a communication received by a first module from a second module. In accordance with one aspect of the invention, the first module encrypts a shared secret using a public key of an asymmetric key pair and sends the encrypted shared secret to the second module. The second module retrieves the private key of the asymmetric key pair from a secure and trusted information store, such as a license information store, and uses the private key to obtain the shared secret to generate authentication data for a message sent from the second module to the first module. The first module performs verification processing using the shared secret. In accordance with another aspect of the invention, the second module uses a private key of an asymmetric key pair obtained from the license information store or other secure and trusted information store to generate a digital signature for a message sent from the second module to the first module. The first module performs verification processing using the public key of the asymmetric key pair.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
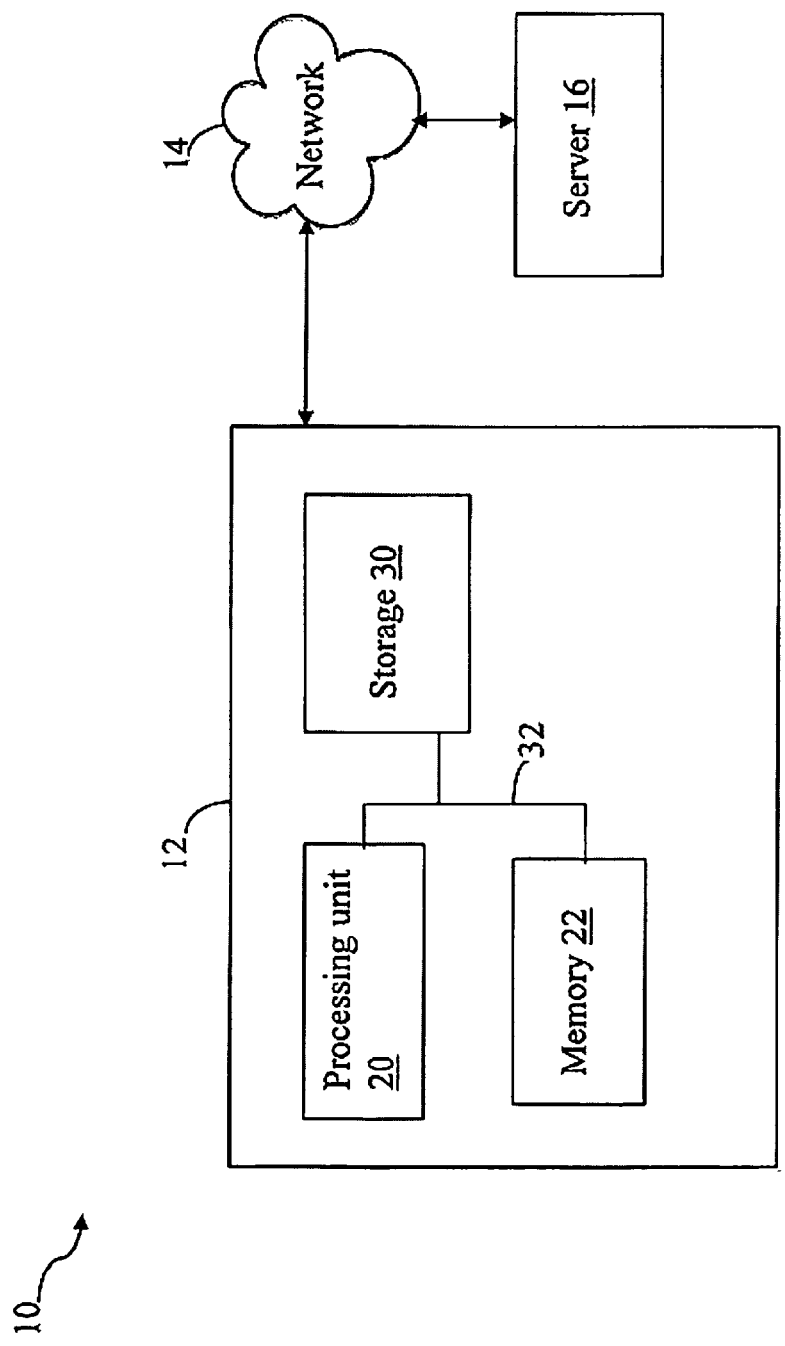
FIG. 1 is an example of an environment that may be utilized in an embodiment in connection with the techniques described herein.

Referring to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a computer 12, a network 14, and a server 16. The computer 12 may include a standard, commercially-available computer or a special-purpose computer that may be used to execute one or more program modules. Described in more detail in following paragraphs and figures are program modules that may be executed by the computer 12 in connection with ensuring the integrity and authentication of a received communication using the techniques described herein. The computer 12 may operate in a networked environment and communicate with other computers, such as a server 16, as well as others not shown in FIG. 1.

It will be appreciated by those skilled in the art that although the computer 12 is shown in the example as communicating in a networked environment, the computer 12 may communicate with other components utilizing different communication media. For example, the computer 12 may communicate with one or more components utilizing a network connection, and/or other type of link known in the art including, but not limited to, the Internet, an intranet, or other wireless and/or hardwired connection(s).

As illustrated in FIG. 1, the computer 12 may include one or more processing units 20, memory 22, storage 30, and a system bus 32 used to facilitate communications between the components of the computer 12, as well as other components not illustrated in FIG. 1.

Depending on the configuration and type of computer 12, memory 22 may be volatile (such as RAM), non-volatile (such as ROM, flash memory, etc.) or some combination of the two. Additionally, the computer 12 may also have additional storage (removable and/or non-removable) including, but not limited to, USB devices, magnetic or optical disks, or tape. Such additional storage is illustrated in FIG. 1 by storage 30. The storage 30 may include one or more removable and non-removable storage devices having associated computer-readable media that may be utilized by the computer 12. The storage 30 in one embodiment may include a hard disk and/or CD-ROM drive. By way of example, and not limitation, memory 22 and storage 30 are examples of computer readable media. Computer readable media includes volatile and non-volatile, removable and non-removable media implemented in any method or technology for storage of information such as computer readable instructions, data structures, program modules or other data. Computer readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by the computer 12. The foregoing media typically embodies computer readable instructions, data structures, program modules or other data.

In one embodiment as described herein, the computer 12 may operate in a networked environment as illustrated in FIG. 1 using logical connections to remote computers, such as the server 16, through a network. One or more software modules and/or data files may be included in storage 30 of the computer 12. During operation of the computer 12, one or more of these modules included in the storage 30 may also reside in a portion of memory 22, such as, for example, RAM for controlling the operation of the computer 12.

The server 16 may represent a server computer system connected to the network 14. The server computer system may include software modules to service requests and one or more processors, memory, storage, and the like, similar to that as described herein with respect to the computer 12. The techniques herein may be used in an embodiment in which the computer 12 and the server 16 may communicate over the network 14. The computer 12 and the server 16 may perform operations in connection with processing communications exchanged therebetween. For example, the computer 12 may send a request to the server 16 and the server 16 may provide a response. The techniques herein may be used to ensure the integrity and authenticity of a received communication, such as the response received by the computer 12 from the server 16, or such as the request received by the server 16 from the computer 12. Data integrity may relate to the communication content and ensuring that the communication received is not a modified version of the original communication. Authenticity may relate to the authentication of the sender in that a communication received may have been generated by an entity other than the expected sender.

The techniques herein may also be used in an embodiment in connection with communications exchanged between two modules on the same computer system, such as two modules on computer 12. More generally, the techniques herein may be used in connection with ensuring the authentication and integrity of a message received from a sender. The techniques herein may be used in connection with communications transmitted in one direction, such as from the server 16 to the computer 12, as well as in connection with communications transmitted in both directions, such as from the server 16 to the computer 12 and also from the computer 12 to the server 16.

For purposes of illustration, exemplary embodiments are set forth in more detail below in which processing is performed using the techniques herein to ensure the integrity and authentication of a response received by a first module from a second module in which the first and second modules may be located on the same computer, such as on computer 12. However, as will be appreciated by those skilled in the art and also more generally described elsewhere herein, the techniques may be used in connection with communications transmitted between entities on different computer systems rather than the same computer system, communications received by the first and second modules rather than just those received by the first module, and the like.

Figure 2:
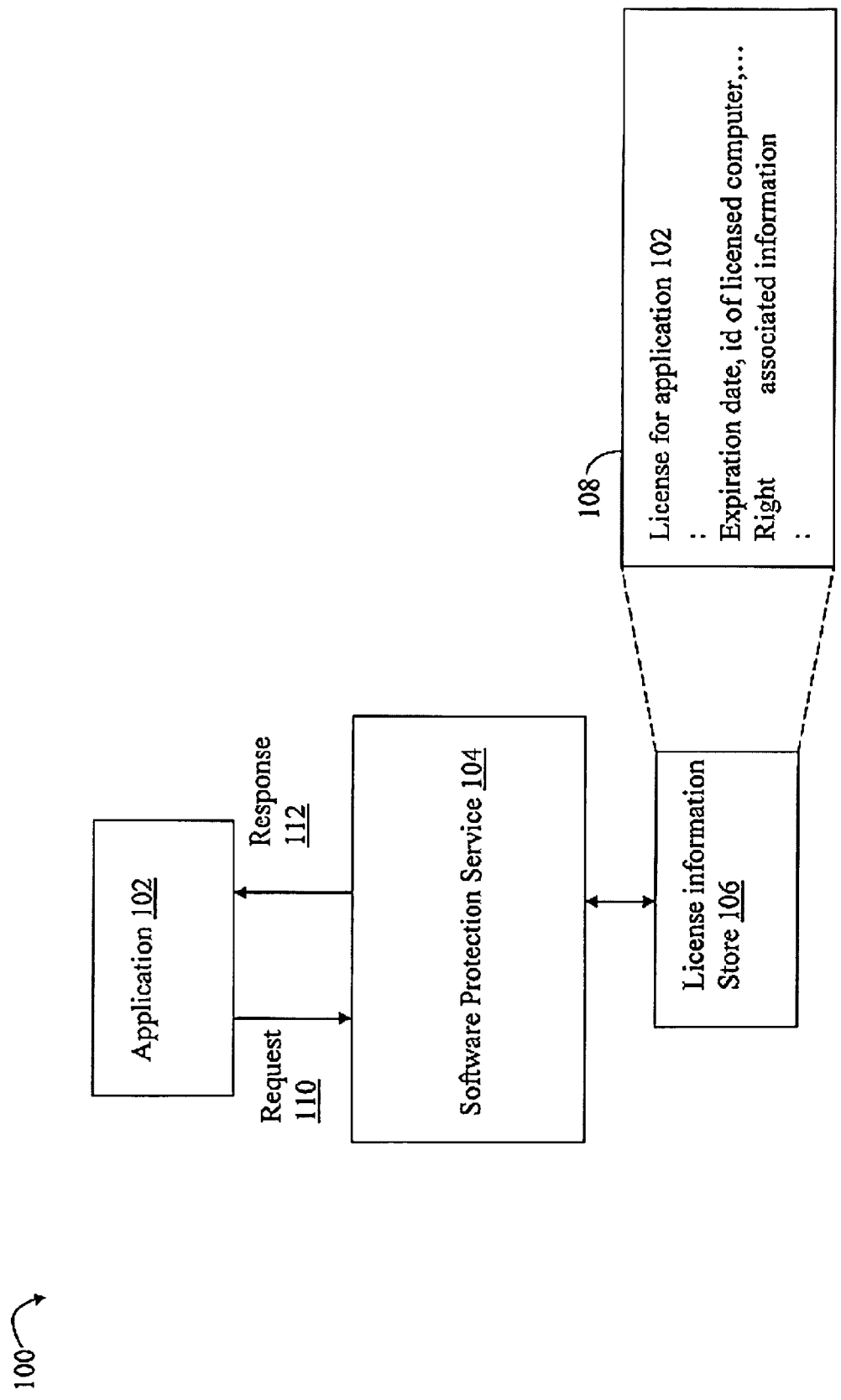
FIG. 2 is an example of components that may be included in an embodiment and used in connection with performing the techniques herein.

Referring to FIG. 2, shown is an example 100 of modules that may be included on the computer 12 of FIG. 1 for use in connection with the techniques herein. The example 100 includes an application 102, software protection services (SPS) 104 and license information store 106. The application 102 may be an installed program on the computer 12. License information store 106 may include licensing information for one or more software products licensed for use on the computer. The store 106 may be any one of a variety of different data storage entities including the licensing information for one or more software may be a file, database, or other data container. Element 108 illustrates a logical representation of license information for the application 102 that may be included in the license information store 106. The information of 108 may, for example, specify expiration dates, identify the computer licensed to execute the application 102, identify the rights granted by the license, and the like. The store 106 may also include information associated with individual rights granted in the license. For example, as will be described in more detail in following paragraphs, a license may grant a right to "run" the application 102. The license information store 106 may also associate information with the right to run. As an example, a private key of an asymmetric key pair may be encrypted and stored in 106. The private key may be associated with the "run" right as well as other rights for the license of application 102. It should be noted that the license information store 106 may include license data obtained in connection with prior software installations and activations performed in any of a variety of different ways.

As known in the art, an asymmetric key pair is used in connection with different asymmetric cryptography techniques in which different keys are used for encryption and decryption, such as use of public/private key pairs with PKI (Public Key Infrastructure). A message encrypted using the public key cannot be decrypted except by a recipient possessing the corresponding private key. The use of the asymmetric key pair in embodiments performing the techniques herein is described in more detail in following paragraphs.

The SPS 104 may manage licenses for one or more software products, such as application 102, on the computer system. The SPS 104 may perform functions related to the use of licenses and expose the functions through an API. The SPS 104 may perform functions such as obtaining licenses, storing and managing licenses, protecting licenses from tampering, evaluating the validity of a license, evaluating whether a license is correctly bound to a machine (e.g., license indicates that a software product can execute on the machine), evaluating whether the license grants a particular right for the software product, and the like. The application 102 may use the API to send a request 110 to the SPS 104. In response to receiving request 110, the SPS 104 may send a response 112 to the application 102. The application 102 may issue request 110 to obtain information regarding the license for the application 102. For example, a user may issue a request to run the application 102. "Run" may be a right associated with the application indicating that the user has the right to run the application. The request 110 may be sent to SPS 104 in order to determine if the license indicates that there is an existing and valid license granting a right to run the application 102 on the computer. In response to receiving the request, SPS 104 may perform license validation and verification processing with respect to the license for the application 102 and the requested right. For example, SPS 104 may retrieve license information for the application 102 from the license information store 106 and perform processing to determine whether there is a valid license for the application 102, whether the license indicates that the application 102 is correctly bound to the computer 12, and whether the license indicates that the specified right is granted per the license. The response 112 returned from SPS 104 may indicate whether the foregoing validation and verification processing has been successful with respect to a currently valid license granting the requested right (e.g., the right to "run" the application in this example).

A license, such as may be expressed in an electronic form or document that may be stored in the license information store 106, specifies rights in a software product. A caller, such as the application 102, may use the API to call a "consume" method in order to "consume" a right for a software product, such as the application 102. After successful consumption of a right for the software product, additional data associated with a right may be retrieved from the license information store 106. With reference to element 108 as described above, after successful consumption of the run right, the private key associated with the run right may be retrieved from the license information store 106. Consumption of a right for a software product may be characterized as processing steps performed to verify and validate a license and right for the software product as mentioned above. The license, such as expressed as an electronic document included in the license information store 106, may include information used in connection with the consumption processing. The consumption processing may include, for example, checking whether the software product is licensed to execute on the machine on which the software is running, checking license validity such as whether the license has expired, and the like. For the software application, the license may also specify different rights which are allowed to be performed in connection with the application. For example, as just described, "run" may be a right indicating that the user has the right to run the software product. The consume rights API may be invoked to determine whether there is currently a valid license with a right to run the software product. If so, the license and right are successfully consumed. As a subsequent step after successful consumption processing, additional information, such as the private key, associated with the consumed right may be retrieved from the license for the application 102 as included in the license information store 106. US Patent Publication 2005/0091168 A1 ('168 publication), U.S. patent application Ser. No. 10/692,868, filed Oct. 24, 2003, PROGRAMMING INTERFACE FOR LICENSING, Gunyakti et al., which is hereby incorporated by reference, describes an exemplary software licensing service and API that allows other modules to use a license management functionality of a common service. The licensing management facility and API in the foregoing '168 publication are similar to that as just described in connection with SPS 104.

As will be described in following paragraphs, the private key retrieved from the license information store 106 upon successful consumption of a specified right may be used in connection with the techniques herein to ensure the data integrity and authenticity of the response 112 as received by the application 102 from SPS 104.

In connection with one embodiment, the application 102 may establish a session with SPS 104 through an exchange of other communications between the application 102 and SPS 104 prior to the application 104 issuing the request 110. In connection with establishing the session, the application 102 may indicate a particular public key of an asymmetric key pair that the application 102 will use in connection with subsequent communications for the session. The application 102 may also generate a session key characterized as an identifier which is unique per session. The session key may be associated with communications exchanged between the application 102 and SPS 104 for the associated session. The session key may be generated using any one of a variety of different techniques which ensures a sufficient level of uniqueness for each session. For example, the session key may have a size in the range of 16 to 64 bytes and may be generated using a random number based on the public key, current time, and the like. The session key may be more generally referred to herein as one type of shared secret representing an identifier having a different value for each session.

The application 102 encrypts the shared secret using the public key of the asymmetric key pair as specified when establishing the session with SPS 104. The application 102 constructs the request 110 that includes the encrypted shared secret and any other data for the particular request. Such other data may, for example, identify a right for which the request 110 is being issued. As described above, the request 110 may be a query as to whether a right, such as the "run" right, included in the request is granted in a valid license indicating that application 102 is allowed to execute on the computer 12.

It should be noted that the shared secret may be "shared" with respect to the application 102 and as communicated in encrypted form to the SPS 104.

Figure 3:
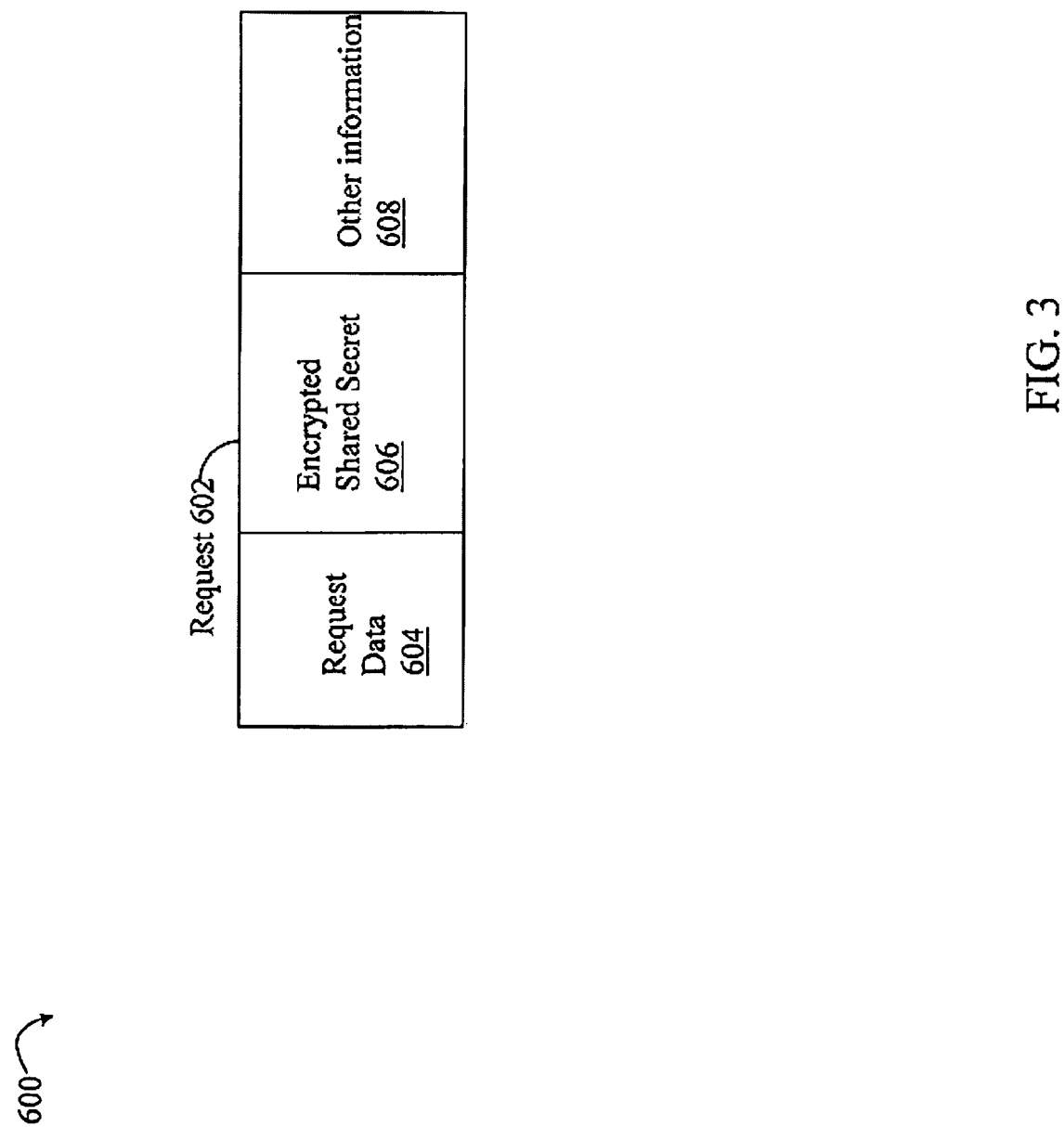
FIG. 3 is an example representation of a request that may be used in an embodiment performing the techniques herein.

Referring to FIG. 3, shown is an example representation of a request 110 as may be sent from the application 102 to SPS 104. The request 602 includes request data 604, the encrypted shared secret 606, and optionally other information 608 for the request. The request data 604 may, for example, identify a particular operation to be performed by SPS 104, identify one or more rights, identify the application 102, and the like. Element 606 may represent the shared secret which is encrypted using any one of a variety of different asymmetric encryption techniques, such as RSA, using the public key associated with the current session.

SPS 104 receives the request 110 and performs processing to consume the specified right in the request with respect to the license for the application 102. As described above, the consumption of rights may include performing validation and verification processing with respect to the license and specified right for application 102 based on information included in the license information store 106. For example, SPS 104 may retrieve license information for the application 102 from the store 106 to determine whether the license has expired, whether the license indicates that the application 102 is authorized to execute on the particular computer 12, whether the right specified in the request 110 is granted in the license, and the like. If processing determines that the specified right is granted in connection with a valid license for use on the computer 12, the right has been successfully consumed. Upon successful consumption of a right, additional information associated with that right may be subsequently retrieved from the license information store 106. In connection with an embodiment in accordance with the techniques herein, a private key may be associated with the specified consumed right and retrieved from the store 106. The private key may correspond to the public key of the asymmetric private/public key pair used by the application 102 to encrypt the shared secret. Upon successful consumption of the specified right for the request 110, SPS 104 retrieves the private key from the license information store 106, and decrypts the encrypted shared secret 606 as included in the request from the application 102. SPS may also perform other processing in connection with the request.

It should be noted that SPS 104 may perform processing to determine whether a private key retrieved from the license information store 106 is the mated asymmetric key for the public key specified when the session was established. For example, the license information store 106 may include both the private key and the corresponding public key of the asymmetric pair and both may be retrieved from 106. SPS 104 may determine whether the public key retrieved from the store 166 matches the public key specified when the session was established. If the public keys do not match, SPS 104 may take appropriate steps such as terminating processing and returning an appropriate status in the response. Also, there may be multiple private keys retrieved upon successful consumption and SPS may perform processing by matching public keys to select the appropriate private key.

Figure 4:
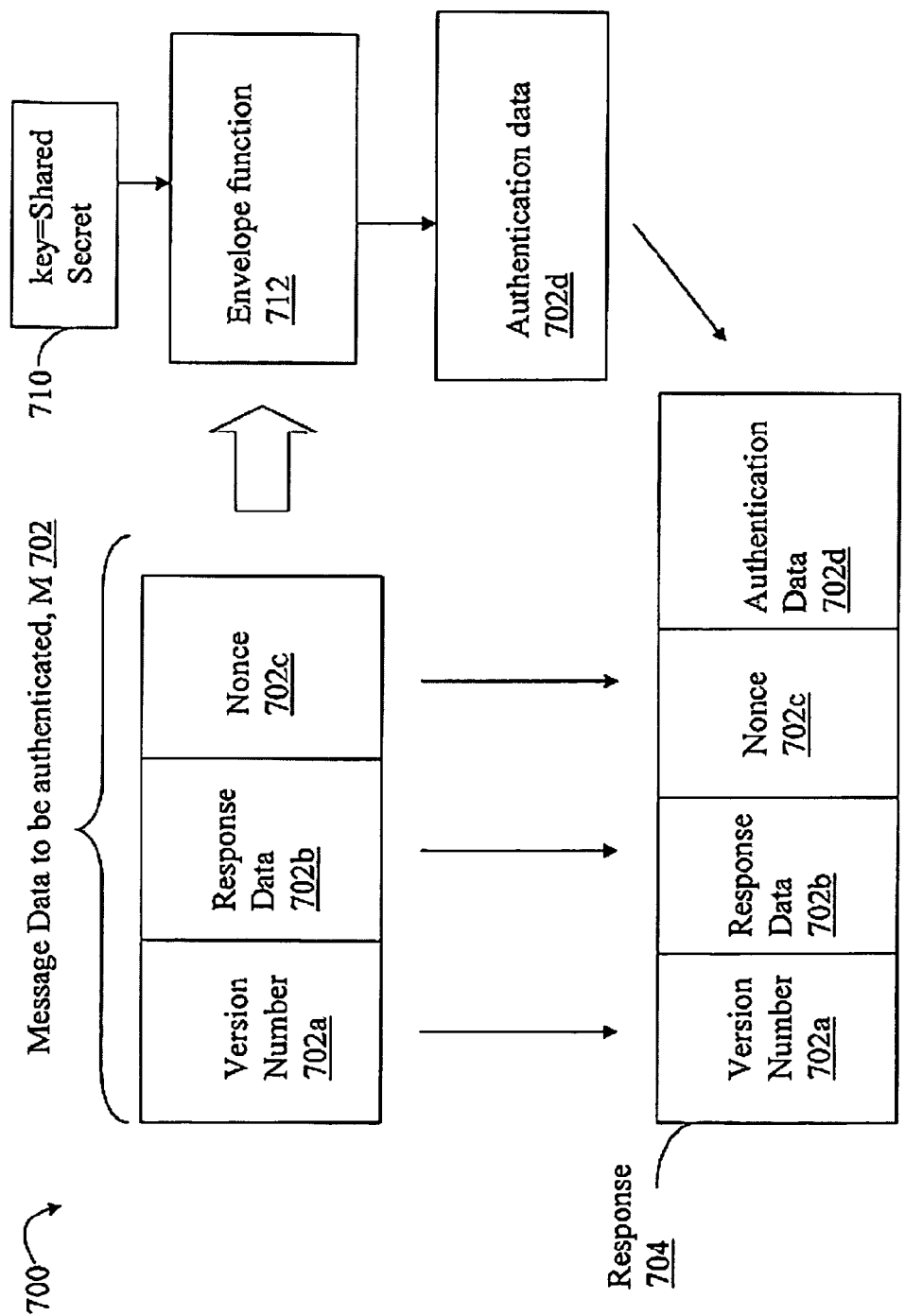
FIG. 4 is an example representation of a response and how authentication data included the response may be determined in an embodiment using the techniques herein.

Referring to FIG. 4, shown is an example illustrating processing that may be performed to determine data included in the response 112 to be sent to the application 102. The response 704 may include a version number 702*a*, optional response data 702*b*, an optional nonce 702*c*, and authentication data 702*d*. As described below, the version number 702*a*, and optionally the response data 702*b* and/or the nonce 702*c*, may be used as an input to processing which generates the authentication data 702*d*. A nonce may be referred to as a "number used once" that changes with each message that is authenticated as described below in more detail in connection with element 702.

The version number 702*a* may be a version number associated with SPS 104. The version number 702*a* may be obtained by SPS 104 in a variety of different ways. For example, the version number may be coded within the module SPS 104, retrieved from the license information store 106 or other predetermined location on the computer 12. An embodiment may select a suitable size for the version number 702*a*. For example, an embodiment may use a version number 702*a* which may have a maximum size of 4 bytes. The response data 702*b* may be optional, for example, if the particular request 110 does not have any information that is returned to the caller. Nonce 702*c* may be characterized as a number or other token that is unique for each response communication. For example, nonce 702*c* may be a random or pseudo-random number generated by SPS 104. The nonce 702*c* may be used in an embodiment to assist in the prevention of replay attacks. A replay attack may be characterized as an attack in which a valid data transmission may be intercepted and then repeated or retransmitted. Such a replay attack may be prevented since a different nonce 702*c* is included in each response thus causing the message data 702 and generated authentication data 702*d* to also change for each response.

As illustrated, the message data to be authenticated 702 may include 702*a* and may also include 702*b* and/or 702*c*. The message data 702 may be formed by concatenating 702*a* and optionally 702*b* and/or 702*c*. The message data 702 is a first input to an envelope function 712 which uses the shared secret 710 in determining the authentication data 702*d*. In one embodiment, the envelope function 712 may be processing performed to determine an HMAC (keyed-hash message authentication code) value as the authentication data 702*d*. An HMAC value may be calculated using a cryptographic hash function in combination with a key, which in this example is the shared secret 710. As described above, the shared secret 710 may be obtained by decrypting a portion of the request using the private key obtained from the license store 106. The HMAC value may be used as authentication data 702*d* to verify both data integrity and authentication of message data 702 used to generate the HMAC value. HMAC may be defined as:

$$\text{HMAC}_{KEY}(M) = h((\text{KEY XOR opad} \| h((\text{KEY XOR ipad}) \| m))$$  EQUATION 1.

where h is a selected cryptographic hash function, KEY is a key, such as the shared secret obtained by decrypting a portion of the request, where KEY is padded with extra zeroes for the particular block size of the hash function, h, and M is the message 702 to be authenticated. It should be noted that "∥" denotes concatenation, XOR denotes the logical exclusive OR operation, and the outer padding "opad" is a hexadecimal constant 0x 5c5c5c . . . 5c5c and inner padding "ipad" is also a hexadecimal constant 0x363636 . . . 3636. In this example, M may be represented as 702 formed as a result of concatenating the version number 702*a*, and optionally, the response data 702*b* and/or the nonce 702*c*. Any one of a variety of different cryptographic hash functions, such as SHA-1, or MD-5, may be used as the hash function, h, in the above-referenced expression for HMAC. The cryptographic strength of the HMAC value may depend on the underlying hash function, size and quality of the key, and size of the hash output length in bits.

In connection with HMAC, the KEY is used in forming the content which is hashed by the hashing algorithm, h. As an alternative, rather than determine authentication data using EQUATION 1 (HMAC) as the envelope function, an embodiment may use a symmetric cryptographic technique such as AES (Advanced Encryption Standard) as the envelope function which uses the shared secret as the symmetric key. In other words, rather than use an envelope function 712 that is a keyed hash algorithm based on a hash function to generate an HMAC value as the authentication data, an embodiment may alternatively use as the envelope function 712 a keyed hash algorithm based on a symmetric cryptographic technique, such as AES to generate authentication data 702*d*. In connection with symmetric cryptographic techniques such as AES, the key is used as a first input and the content forming the message is a second input. It should be noted that a symmetric cryptographic technique uses a same key for encryption and decryption operations.

It will be appreciated by those skilled in the art that the envelope function may be more generally any algorithm that generates authentication data based on inputs including the message and key. The HMAC algorithm and symmetric cryptographic techniques as described herein are examples of the envelope function that may be used in an embodiment.

The nonce 702c may be determined in a variety of different ways and made known to both the application 102 and SPS 104 in a variety of different ways. For example, SPS 104 may use a time-based value, random number generator, and the like, to generate a value used as the nonce. The response 112 sent to the application from SPS may include this nonce, or a value from which the application can determine/derive the nonce. As another example, the application may determine the nonce, or value used to derive the nonce, and may include this in the request sent to SPS. SPS may then use this nonce to form the message 702 used in determining the HMAC value. More generally, an embodiment using a nonce 702c may generate the nonce in any way that is understood by SPS and the application.

Once the authentication data 701d has been determined, SPS 104 constructs the response 704 as illustrated and transmits the response 704 to the application 102. It should be noted that the response data 702b and other portions of the response may be optionally encrypted in an embodiment. An embodiment may select to encrypt the response data 702b, for example, if the response data 702b includes valuable content or content which SPS 104 does not want to transmit in a readable form.

Upon receipt of the response, the application 102 performs any decryption necessary, for example, if SPS 104 encrypted the response data 702b. The application 102 then performs verification processing. More specifically, the application 102 computes its own copy of authentication data in the same way that SPS 104 computed authentication data included in the response. The application 102 computes its own copy of authentication data using the shared secret, which is already known to the application 102, as well as the version number 702a, and response data 702b and/or nonce 702c, if any, as included in the received response. The application 102 performs processing for determining an HMAC value or other envelope function as may be used in an embodiment to determine authentication data. The application 102 compares its own computed copy of the authentication data to the authentication data 702d included in the response. If the two match, then verification processing is successful. Otherwise, verification processing fails.

It should be noted that an embodiment may also perform additional steps in connection with verification processing. For example, the application 102 may also perform an additional check in connection with the version number 702a received in the response. The application 102 may retrieve an expected value of the version number and compare the expected value to the version number 702a included in the response. The application 102 may obtain the expected version number in a variety of different ways such as those described elsewhere herein in connection with SPS 104.

In connection with the exemplary embodiment just described, the application wants to ensure that the response received has been sent by SPS 104, and not another entity purporting to be SPS 104. The application 102 also wants to ensure that the received response has not been modified. To ensure the authenticity and data integrity of the received response, the application 102 generates a challenge, which is the shared secret, encrypts the challenge with the public key, and sends the encrypted challenge to SPS 104. SPS 104 then performs processing to prove that it is in possession of the private key stored in connection with the license information for the application 102. SPS 104 proves it is in possession of the private key by decrypting the challenge (e.g., shared secret) and using the decrypted value to form the authentication data. The application 102 verifies the response by computing expected authentication data and comparing the received authentication data in the response to the expected authentication data.

Figure 5:
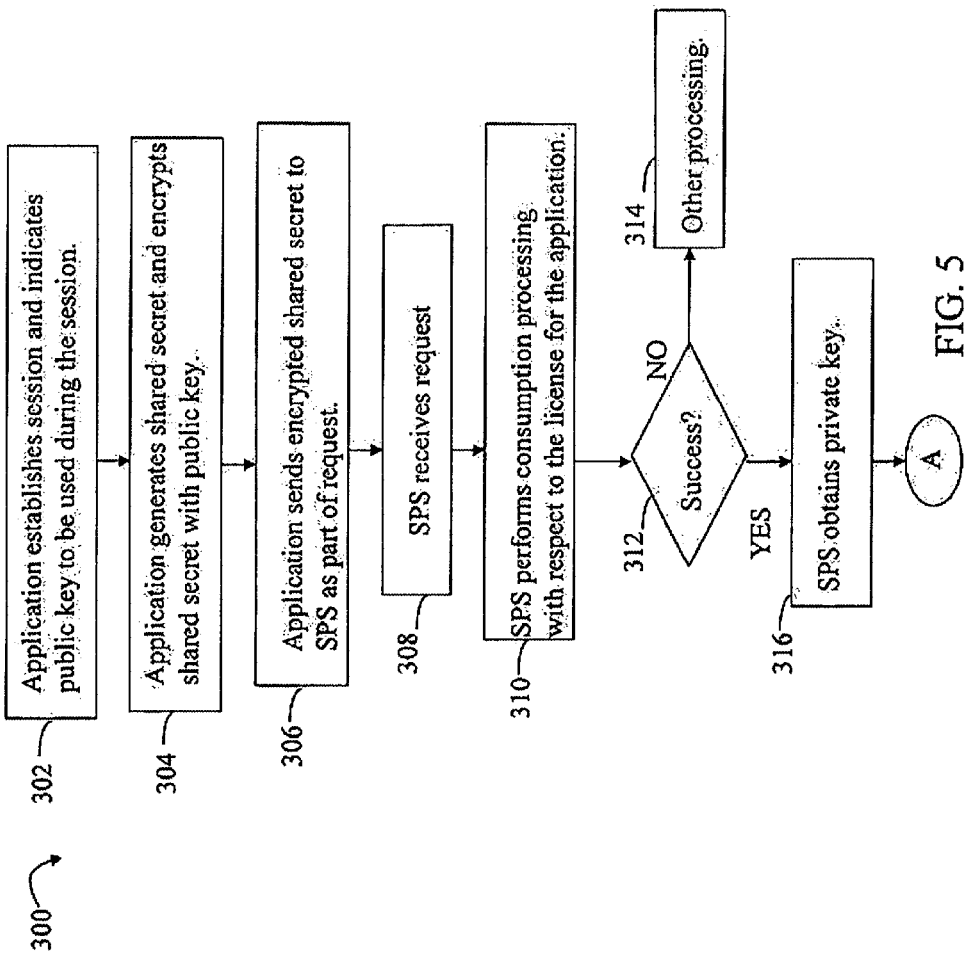
FIGS. 5 and 6 are flowcharts of processing steps that may be performed in an embodiment using the techniques herein.
Figure 6:
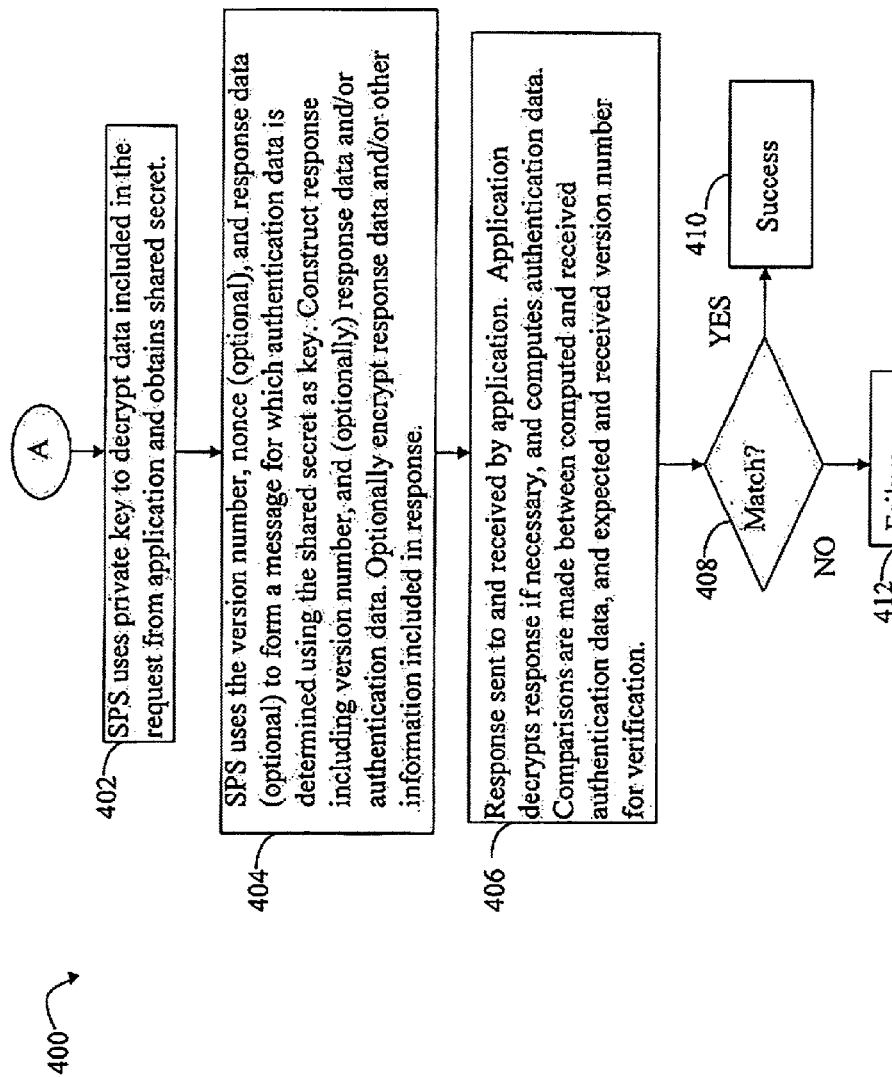

Referring to FIGS. 5 and 6, shown are flowcharts of processing steps that may be performed in an embodiment in accordance with the techniques herein. The steps of FIGS. 5 and 6 summarize processing just described above. At step 302, the application establishes a session with SPS and indicates the public key to be used during the session. SPS will use this public key to determine the matching asymmetric private key to be retrieved from the license stored in subsequent processing. As described above, the session may be established, for example, by one or more communications exchanged between the application and SPS. At step 304, the application generates the shared secret and encrypts the shared secret with the public key associated with the session in step 302. At step 306, the application sends the encrypted shared secret to SPS as part of the request. At step 308, SPS receives the request. At step 310, SPS performs processing to consume a specified right as may be indicated in the request with respect to the license for the application. At step 312, a determination is made as to whether consumption processing was successful. If not, control proceeds to step 314 where steps associated with unsuccessful consumption processing may be performed. Step 314 may include SPS returning a code indicating the status of step 310 processing. If step 312 evaluates to yes, control proceeds to step 316 where SPS obtains the private key of the asymmetric key pair for the public key of step 302. Step 316 may include the SPS retrieving the private key from the license information store including license information for the application. From step 316 of FIG. 5, control proceeds to step 402 of FIG. 6 where SPS uses the private key to decrypt data of the request and obtain the shared secret. At step 404, SPS uses the version number, nonce (optional), and response data (optional) to form a message for which authentication data is determined using the shared secret as the key. SPS constructs a response including the version number, nonce (optional), response data (optional), and authentication data. An embodiment of the SPS may also optionally encrypt the response data and/or other information included in the response. At step 406, SPS sends the response to the application. The application decrypts the response, if necessary, and computes authentication data. The application performs verification processing by comparing the computed authentication data to the authentication data received in the response. An embodiment may also perform other comparisons in connection with verification processing such as, for example, comparing the received version number in the response to an expected version number. At step 408, a determination is made as to whether the authentication data values of step 406 match. Step 408 may also include determining whether comparisons between other data values, such as expected and received version numbers, indicate a match. If step 408 evaluates to yes, the application determines that verification processing is successful. Otherwise, if step 408 evaluates to no, the application determines that verification processing has failed. Successful verification processing ensures the application regarding the authenticity and integrity of the received response.

What will now be described is another embodiment using the techniques herein in which SPS uses the private key retrieved from the license information store for generating the authentication data, which is a digital signature, using an asymmetric cryptographic technique, such as RSA. The private key retrieved from the license may be used to form the digital signature. The application may receive the response including the authentication data (digital signature) and then use the public key in connection with performing verification processing. In connection with verification processing, the application receives the encrypted hash value which is the digital signature, computes a newly generated hash value formed by the application, and uses the public key to verify the newly generated hash value against the digital signature. In this embodiment, the "message" used by SPS to generate the hash value which is then encrypted (by SPS as the "signature") using the private key may include the following concatenated together: module version number, response data (if any) and/or nonce (if any). The nonce may be determined and made known to SPS and the application in a variety of different ways similar to that as described above. In connection with this latter embodiment using digital signatures, the request doesn't need to include a shared secret. Rather, the application may specify the public key to use, for example, when the session is initially established. SPS may retrieve the private key corresponding to this public key which it uses to form the digital signature in the response. The application may then perform verification processing using the public key before accepting the response as valid.

What will now be described in more detail are representations of the request and response and flowcharts of processing steps that may be used in an embodiment using digital signatures as just described.

Figure 7:
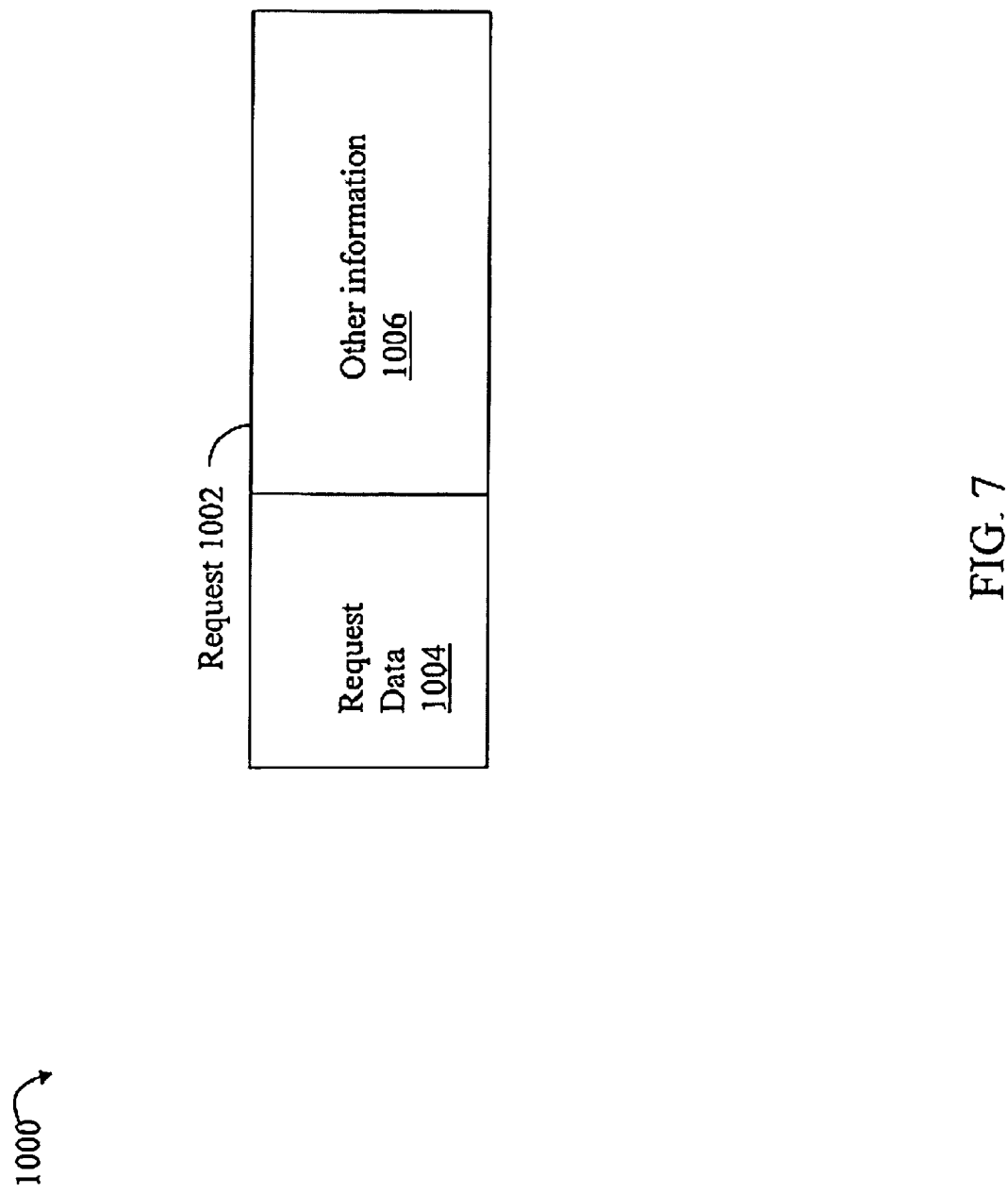
FIG. 7 is an example representation of another request that may be used in an embodiment performing the techniques herein.

Referring to FIG. 7, shown is an example of a request that may be used in an embodiment in which the authentication data is a digital signature. The request 1002 includes request data 1004 and optionally other information 1006. In contrast to the request of FIG. 3, the encrypted shared secret is omitted from the request in this latter embodiment. Other portions of the request are similar to as described above in connection with FIG. 3.

Figure 8:
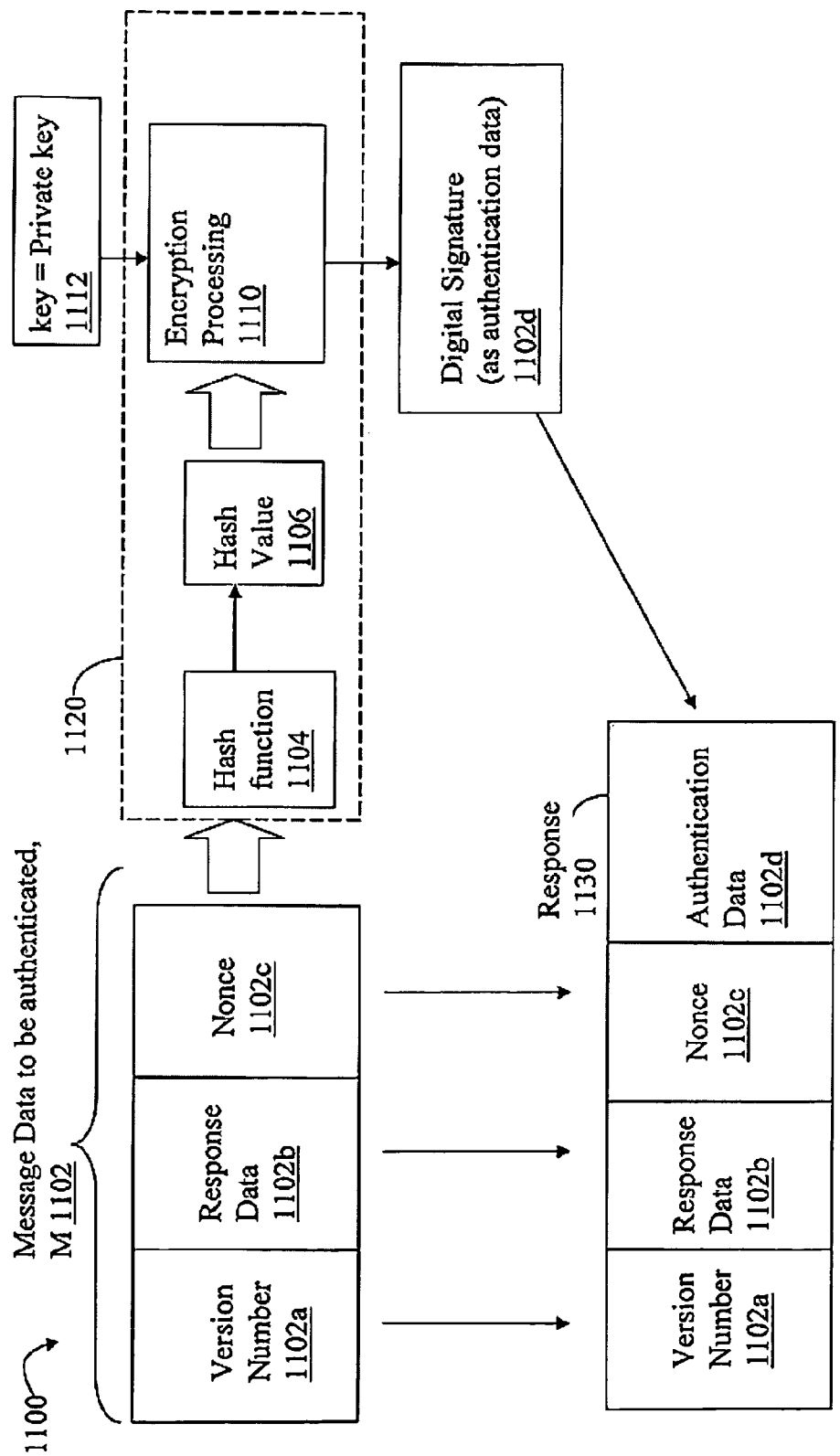
FIG. 8 is an example representation of another response and how authentication data included the response may be determined in an embodiment using the techniques herein.

Referring to FIG. 8, shown is an example illustrating processing that may be performed to determine data included in the response 1130 sent to the application 102. The response 1130 may include a version number 1102a, optional response data 1102b, an optional nonce 1102c, and authentication data 1102d. Elements 1102a, 1102b and 1102c may be as described above in connection with FIG. 4. The response 1130 also includes authentication data 1102d but the authentication data 1102d in this embodiment is the digital signature in contrast to the authentication data 702d of FIG. 4. In the example 1100, the message data 1102 may be input to a cryptographic hash function 1104 which generates a hash value 1106 which is then encrypted using encryption processing 1110 using the private key 1112 to obtain the digital signature 1102d as the authentication data 1102d. In connection with this embodiment, the components included in 1120 may form processing performed by the envelope function generally described above and, for example, as illustrated in FIG. 4.

Figure 9:
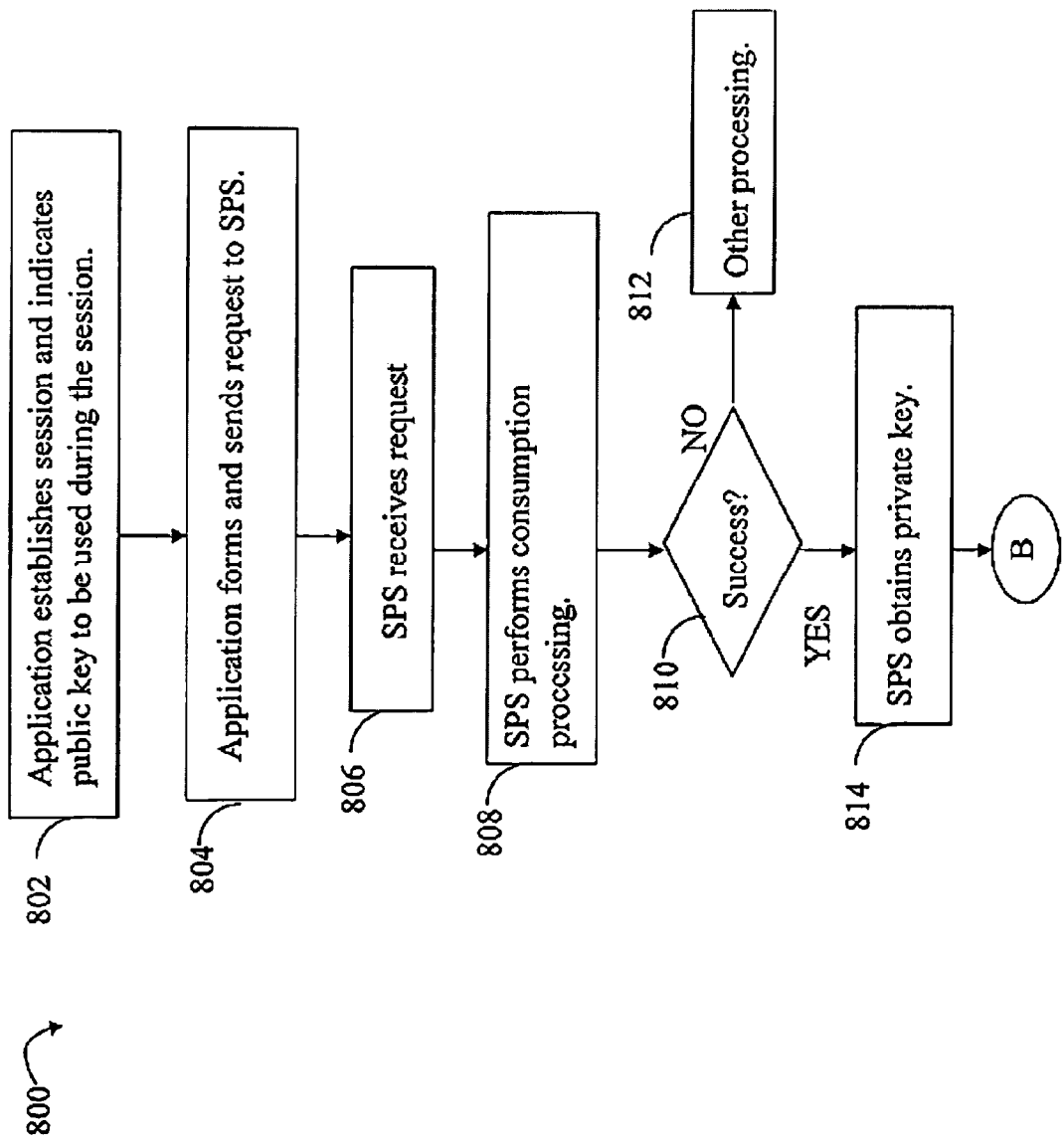
FIGS. 9 and 10 are flowcharts of processing steps that may be performed in another embodiment using the techniques herein.
Figure 10:
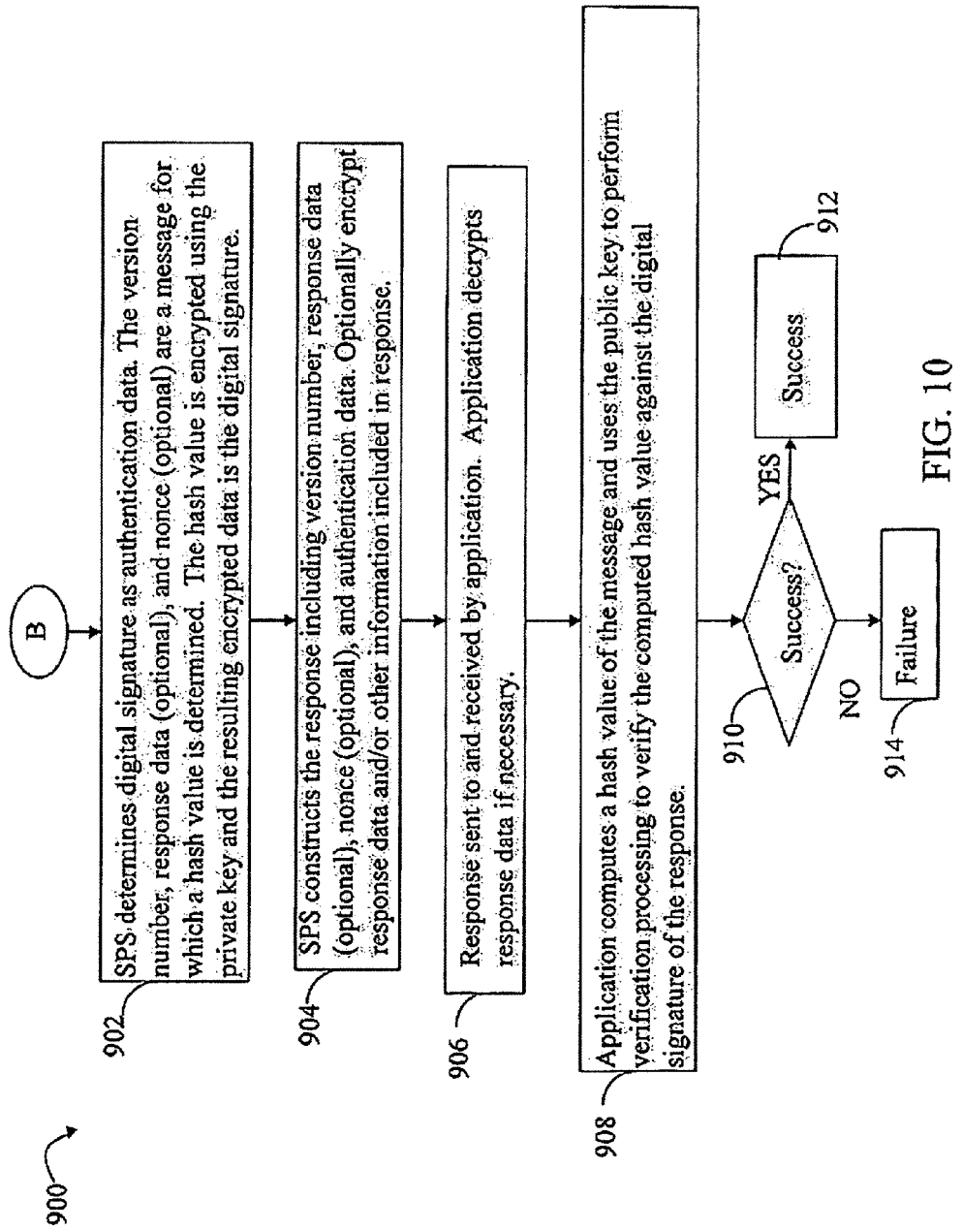

Referring to FIGS. 9 and 10, shown are flowcharts of processing steps that may be performed in connection with another embodiment using the techniques herein. FIGS. 9 and 10 summarize processing just described in an embodiment in which the authentication data is a digital signature. In connection with steps of FIGS. 9 and 10, it will be appreciated that some processing steps are similar to that as described in connection with FIGS. 5 and 6. At step 802, the application establishes a session with SPS and indicates a public key to be used during the session. Step 802 is similar to step 302 of FIG. 5. In step 804, the application forms and sends the request to SPS. An example of such a request is illustrated in FIG. 7. In step 806, SPS receives the request and performs consumption processing in step 808. In step 810, a determination is made as to whether consumption processing is successful. If not control proceeds to step 812. If so, control proceeds to step 814 where SPS retrieves the private key from the license information store. Steps 808, 810, 812, and 814 are respectively similar to steps 310, 312, 314 and 316 of FIG. 5.

In step 902, SPS determines the digital signature as authentication data. The version number and optionally the response data and/or nonce are used to form the message data for which a hash value is determined. The hash value is then encrypted using the private key and the resulting encrypted data is the digital signature included in the response as the authentication data. In step 904, SPS constructs the response including the version number, response data (optional), nonce (optional), and authentication data. The response data and/or other information in the response may be optionally encrypted as described in connection with step 404 of FIG. 6. In step 906, the response is sent to, and received by, the application. The application decrypts the response data or other portions of the response as needed. In step 908, the application verifies the digital signature by computing a hash value of the message and using the public key to verify the computed hash value against the digital signature. At step 910, a determination is made as to whether verification processing is successful. If so, verification processing is successful and control proceeds to step 912. Otherwise, verification processing fails and control proceeds to step 914. As described in connection with step 406 of FIG. 6, step 908 may also include comparing other values, such as the received and expected version number, as part of verification processing. In such a case, step 910 may include determining whether the version numbers match. Successful verification processing may be determined in accordance with the authentication data verification, version number comparison, and other comparisons that may be performed in an embodiment.

As described above such as in connection with an embodiment using a digital signature as authentication data, a message may be digitally signed by first determining a hash value for the message content using a hash function to generate a cryptographic hash value. A hash function is an algorithm which creates a digital representation or "fingerprint" in the form of a "hash value" or "hash result" of a standard length. Any change to the message content produces a different hash result when the same hash function is used. The hash value computed for the message content is then encrypted. As part of signing, the message sent to another party may include the message content and the encrypted hash value. The encrypted hash value may also be referred to as the digital signature. Any one of a variety of different hash functions and encryption techniques known in the art may be used in an embodiment. The receiver of the message may then compute a new hash value for the message content received using the same hashing algorithm as the sender and perform verification processing of the new hash value against the digital signature using the public key.

The exemplary embodiments described herein may be used in connection with preventing software piracy. As an example, an unauthorized copy of application 102 may be installed for use on a computer. An attacker may, for example, substitute another module in place of SPS 104 which the application 102 communicates with as described herein when a user attempts to run the unauthorized copy of the application. An attacker may also intercept and modify a response sent by SPS 104. An embodiment may use the techniques herein so that the application 102 may communicate with SPS to determine whether the license is valid and grants the necessary rights to perform a requested operation. The techniques herein may be used to ensure the integrity and authenticity of the response received by the application 102 so that the application 102 may detect a received communication which has been compromised by an attacker such as described above.

In connection with the exemplary embodiments described herein, the private key may be stored in connection with license information associated with a particular software application. For example, as described above, the private key may be included as part of the license information associated with an application and the license information may be included in a license information store. It will be appreciated by those skilled in the art that the license information for an application is one particular type of application specific information. Other embodiments using the techniques herein may store and associate the private key in connection with other types of application specific information other than license information. Furthermore, the private key and application specific information associated with an application may be stored in other types of repositories or data stores besides a license information store. More generally the application specific information, including the private key, may be stored in any type of secure and trusted information store. The secure and trusted information store may be a data store for storing one or more different types of application specific information including the private key. Also, as described herein in connection with license information, the private key may not be retrieved unless there has been successful consumption processing where the consumption processing includes, for example, determining that there is a valid license for the application and that specified rights are granted by the license. Thus, the license information store provides security and access control in connection with the private key in that the private key cannot be obtained unless consumption processing is successful. In an embodiment in which a different type of secure and trusted information store is used rather than the license information store, other verification and/or validation processing may be required to be successfully performed other than consumption processing prior to providing access to the private key. Such verification and/or validation processing may vary with embodiment and may include, for example, verifying that required data is provided by the application or other module attempting to obtain the private key, verification and/or validation of other data included in the application specific information, verification regarding hardware and/or software information such as, for example, that the application is executing on a particular computer system using a particular operating system, and the like.

Described above are just two examples illustrating use of the techniques herein. It will be appreciated by those skilled in the art that the techniques herein may more generally be used in connection with communications transmitted from any sender to any receiver on the same or different computer systems. Furthermore, the techniques may be used in connection with communications sent in one direction with respect to two modules or other entities, or communications sent in both directions. With respect to the examples herein, the techniques are illustrated in connection with communications sent in one direction from SPS 104 to the application 102. However, the techniques herein may also be used in connection with communications sent from the application 102 to SPS 104, alone, or in combination with using the techniques herein in connection with communications sent from SPS to the application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented communication method comprising:
receiving a request from a first module at a second module, the request comprising a first portion that is a shared secret encrypted with a public key of an asymmetric key pair, the request comprising a second portion identifying a right associated with the request, the shared secret comprising a session key associated with a communication session between the first module and the second module, the session key having a size in a range of bytes and generated based upon the public key and a current time;
selecting a threshold size for a version number associated with an application corresponding to the request, the threshold size corresponding to a specific number of bytes;
determining the version number associated with the application based upon the threshold size; and
sending a response to the request from the second module to the first module, the response comprising authentication data, a token that is unique for the response, and the version number, the authentication data based upon the shared secret.

2. The method of claim 1, the specific number of bytes comprising 4 bytes.

3. The method of claim 1, the determining comprising retrieving the version number from a license information store.

4. The method of claim 1, comprising determining the authentication data using a message comprising at least one of response data or the token.

5. The method of claim 1, the response comprising data items used in forming a message.

6. The method of claim 1, the first module comprised in a first computer.

7. The method of claim 6, the second module comprised in a second computer.

8. The method of claim 1, the determining comprising retrieving the version number from a location on a computer performing the method.

9. The method of claim 1, comprising determining the authentication data using an envelope function that uses the shared secret as a key.

10. The method of claim 1, comprising determining the authentication data using a keyed hash algorithm based on a hash function and the shared secret as a key.

11. The method of claim 1, comprising determining the authentication data using a symmetric cryptographic technique that uses the shared secret as a symmetric key.

12. A computer readable storage medium, excluding signals, comprising executable code stored thereon for:
receiving a request from a first module at a second module, the request comprising a first portion that is a shared secret encrypted with a public key of an asymmetric key pair, the request comprising a second portion identifying a right associated with the request, the shared secret comprising a session key associated with a communication session between the first module and the second module, the session key having a size in a range of bytes and generated based upon the public key and a current time;

selecting a threshold size for a version number associated with an application corresponding to the request, the threshold size corresponding to a specific number of bytes;
determining the version number associated with the application based upon the threshold size; and
sending a response to the request from the second module to the first module, the response comprising authentication data, a token that is unique for the response, and the version number, the authentication data based upon the shared secret.

13. The computer readable storage medium of claim 12, comprising executable code stored thereon for:
performing verification processing.

14. The computer readable storage medium of claim 12, the determining comprising retrieving the version number from a license information store.

15. The computer readable storage medium of claim 12, comprising executable code stored thereon for:
determining the authentication data using at least one of a symmetric cryptographic technique that uses the shared secret as a symmetric key or a keyed hash algorithm based on a hash function that uses the shared secret as a key.

16. The computer readable storage medium of claim 12, the first module comprised in a first computer and the second module comprised in a second computer.

17. A system comprising:
one or more processing units; and
memory comprising instructions that when executed by at least one of the one or more processing units, perform a method comprising:
receiving a request from a first module at a second module, the request comprising a first portion that is a shared secret encrypted with a public key of an asymmetric key pair, the request comprising a second portion identifying a right associated with the request, the shared secret comprising a session key associated with a communication session between the first module and the second module, the session key having a size in a range of bytes and generated based upon the public key and a current time;
selecting a threshold size for a version number associated with an application corresponding to the request, the threshold size corresponding to a specific number of bytes;
determining the version number associated with the application based upon the threshold size; and
sending a response to the request from the second module to the first module, the response comprising authentication data, a token that is unique for the response, and the version number, the authentication data based upon the shared secret.

18. The system of claim 17, the specific number of bytes comprising 4 bytes.

19. The system of claim 17, the determining comprising retrieving the version number from a license information store.

20. The system of claim 17, the method comprising determining the authentication data using a message comprising at least one of response data or the token.

* * * * *